Patented June 12, 1923.

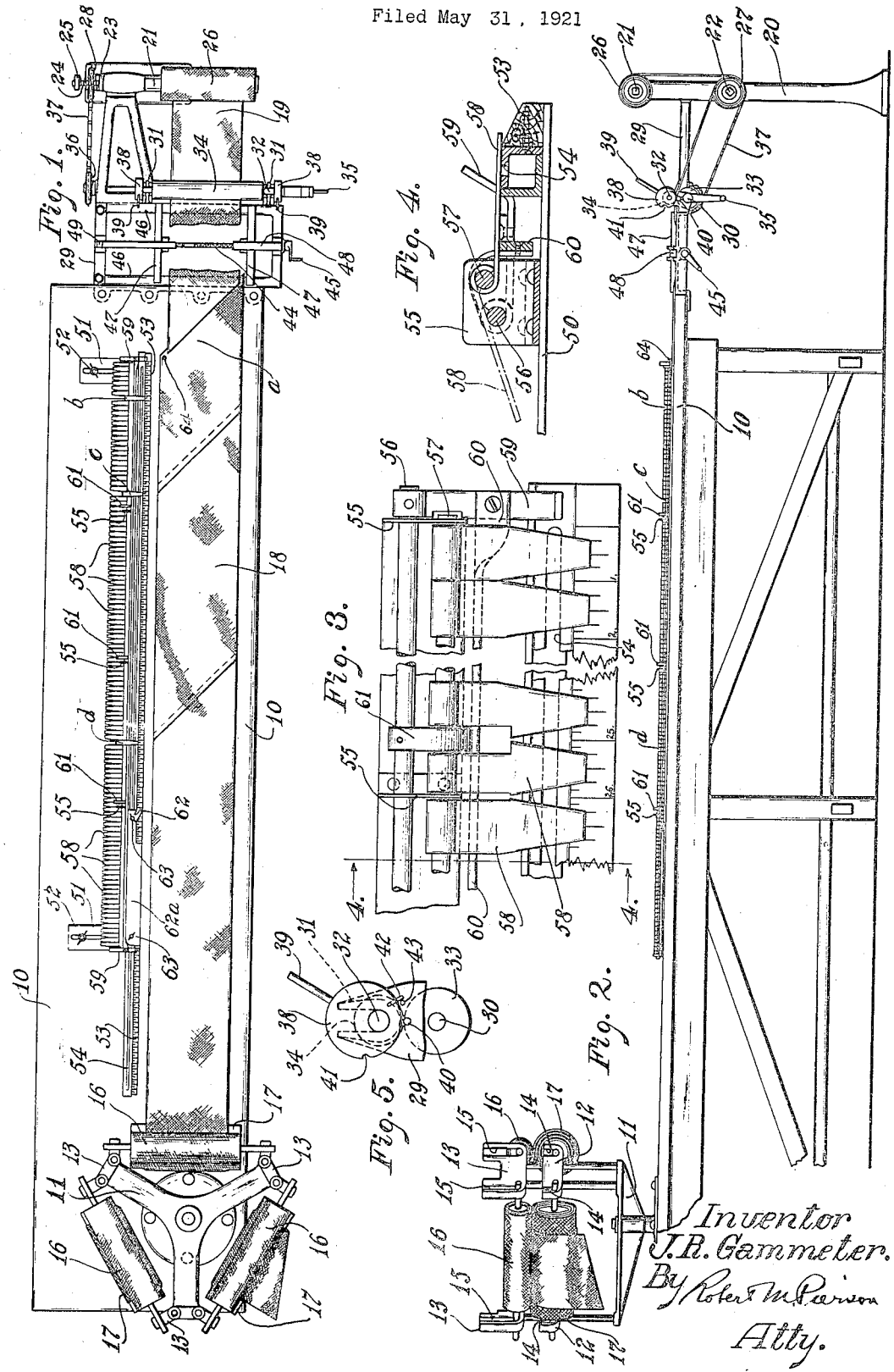

1,458,476

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

APPARATUS FOR PLYING UP TIRE FABRIC.

Application filed May 31, 1921. Serial No. 473,573. REISSUED

*To all whom it may concern:*

Be it known that I, JOHN R. GAMMETER, a citizen of the United States, residing at Akron, in the county of Summit and State of Ohio, have invented a certain new and useful Apparatus for Plying Up Tire Fabric, of which the following is a specification.

This invention relates to means for assembling a plurality of lengths or strips of bias-cut tire fabric into a unitary strip adapted to be drawn progressively onto a tire core to form the carcass of a pneumatic tire. As the strips of integral fabric usually do not correspond in length precisely to the circumference of the tire, splicing of the fabric strips within the length of a ply is necessary to avoid waste; and since the plies that are applied to the tire core before the bead-core or filler-ring is placed need not be as wide as those which go over the bead, economy is also effected by splicing together strips of different widths to go respectively over and under the bead. As to all splices, it is highly desirable that in each tire no two splices, of the same or different plies, should occur at the same place or very close together upon the circumference of the tire.

The main object of my invention is to provide improved means for plying up the stock, by which the proper spacing of the splices may be readily and accurately accomplished, and by which the work in general may be facilitated.

Of the accompanying drawings:

Fig. 1 is a plan view of apparatus embodying a preferred form of my invention showing the work partly broken away.

Fig. 2 is a side or front elevation of the same.

Fig. 3 is a fragmentary plan view on a larger scale.

Fig. 4 is a section on line 4—4 of Fig. 3.

Fig. 5 is an end view of the spliced-strip rolling and tensioning device.

Referring to the drawings:

10 is a table upon the left end of which, as viewed in Figs. 1 and 2, is mounted upon a vertical axis a revoluble rack or turret 11, provided with two sets of brackets 12, 12 and 13, 13, each bracket of the latter set being directly over one of the former set and formed with two angularly-disposed, relatively-long, vertical bearing slots 15, 15, aligned with bearing slots 14, 14 of the lower set of brackets. Each of said slots 15, 15 of the upper set is adapted to co-operate with the adjacent slot of the next bracket of its own set revolubly to support horizontally the spindle of a liner take-up roll 16. 17, 17 are corresponding stock delivery rolls loosely journaled in the slots 14 of the lower set of brackets. Each stock roll comprises a liner with which are interwound the relatively-short, unjoined strips of rubberized fabric as produced by the bias-cutter or as left over from previous operations. Each liner roll 16 by reason of the length of its bearing slots is adapted to rest upon a stock roll 17 and to be rotated by contact therewith, winding upon itself the liner from the stock roll as the fabric strips are withdrawn from the latter, the long slots 15 retaining the spindle of the liner roll while permitting it to rise and fall as the two rolls change in size, in a well-known manner. The turret 11 is adapted to be turned to bring the several rolls 17 selectively into working alignment with the ply-up table 10. 18 represents the work in the form of a number of relatively-short subjoined strips of fabric, and 19 is a "leader" such as is sometimes used to connect successive tire strips in order that they may be successively drawn onto successive tire-forming cores in a tire-building machine with uniform tension.

At the right of the device, as viewed in Figs. 1 and 2, at a distance from the delivery end of the ply-up table, is a standard 20, in the top of which is journaled an over-hanging spindle 21, and in an intermediate part of which is journaled an over-hanging spindle 22, the over-hanging portions of said spindles being squared and positioned in working alignment with the ply-up table 10. The rear end of the upper spindle 21 extends beyond its bearing. 23 is a friction washer splined upon said extended portion and abutting the bearing of said spindle, and 24 is a compression spring interposed upon said portion between said friction washer and a nut 25 threaded upon the rear end of the spindle, said parts being adapted to brake the spindle 21. 26 is a liner delivery roll mounted upon the over-hanging squared portion of spindle 21, and 27 is a stock wind-up roll mounted upon the squared, over-hanging portion of spindle 22. The rear end of spindle 22 extends beyond its bearing in the standard 20, and is provided with a sprocket 28.

Between the standard 20 and the table 10 extends a frame 29 formed with bearings for a transverse horizontal shaft 30 and with slotted or forked bearings 31, 31 thereover for a parallel shaft 32. 33 is an elongated roll loosely journaled on shaft 30, and 34 is an elongated presser-roll preferably of heavy metal construction loosely journaled on shaft 32. 35 is a hand-crank for turning the shaft 30. 36 is a sprocket wheel secured to the rear end of shaft 30, and 37 is a chain connecting said sprocket with the sprocket 28 of shaft 22. 38, 38 are hub cams eccentrically mounted on the shaft 32 outside its respective bearings 31, each cam being provided with a hand-lever 39 and adapted to co-act with a stud 40, extending from the frame 29 adjacent the shaft 30, only one of which studs is shown, to raise the shaft 32 and roll 34 from the roll 33. Each cam 38 is formed with a notch 41 adapted by engagement with the stud 40 to hold said shaft 32 and roll 34 in an elevated position, and with a stop pin 42 adapted to strike a stud 43 (Fig. 5) on the frame to limit the opposite or roll-closing movement of said cams. When brought together, the rolls 33 and 34 are adapted, by their frictional resistance to rotation on their shafts, to tension the plied-up stock strip 18 as it is reeled onto the stock roll 27, and by reason of the weight of the roller 30, to press the fabric flat-wise, straightening it and improving the adhesion of the seams.

The frame 29 is also formed with bearings for a right-and-left-threaded screw 44 disposed transversely of the work and provided with a hand crank 45. The frame 29 is also formed with guide-rails 46, 46 for a pair of transversely-slidable fabric-edge guides 47, 47, threaded upon said screw 44, said guides being formed with notches in the middle of their upper sides, adapted to receive a bar 48 which is pivoted to the frame 29 at 49 and bears upon the upper surface of the work to hold it flat between the edge guides 47. As said bar 48 is permitted by the notches in said side-guides to depress the work below the level of the adjacent members of the frame 29, over which the work slides, it is adapted to exert a tension upon the stock strip as well as a flattening effect. The side-guides 47 are adapted, by the turning of hand-crank 45, to be moved from and toward each other for different widths of stock.

Upon the table 10, back of the work and parallel therewith, is secured a long plate 50 (Fig. 4), with a lateral, rearward, slotted extension 51 at each end, said plate being adapted to be adjusted from and toward the work and secured by means of wing-nuts 52, 52 upon stud-bolts extending upward from the table through the slots of said extensions. 53 is a measuring stick mounted upon the front margin of said plate 50 and provided with a hollow backing structure formed with a longitudinal slot 54 in its upper wall. 55, 55 are small brackets mounted upon said plate 50. 56 is a long rod or rock-shaft parallel to the work, mounted in said brackets, and 57 is a long rod parallel with the work secured in said brackets between the rock-shaft 56 and measuring stick 53, the rod 57 constituting a pivot for a series of outwardly-tapered markers or fingers 58, 58 strung upon said rod in abutting relation to each other, said fingers thus being adapted individually to be laid over forward onto the measuring stick 53, as shown in full lines in Fig. 4, or turned over backward onto the rear rod 56, as shown in broken lines in Fig. 4. These markers 58 are located at definite intervals such as one inch, and the measuring stick is correspondingly marked.

59, 59 are levers secured to the respective ends of the rock-shaft 56, outside of the endmost brackets 55, and 60 is a bar disposed parallel to said rock-shaft, under said fingers when the latter are in their forward position, as shown in Fig. 3, its ends being secured to the middle parts of the levers 59, said bar thus being adapted to be moved by the turning of said levers from the position between the front rod 57 and the measuring stick 53 to a position over the rock-shaft 56, to turn the fingers 58 over backward, away from the measuring stick and onto the rod or rock-shaft 56. 61, 61 are spaced radius arms or levers secured at their outer ends to the bar 60, and at their inner ends to the rear rod or rock-shaft 56, thus being adapted to prevent sagging of the middle part of the bar 51.

62 is an indicator formed on a slide 62$^a$ which is movable along the measuring stick 53 and adjustably secured thereon by clamping bolts mounted in the slot 54 of the hollow backing structure of said measuring stick and provided with wing-nuts 63, 63, said indicator 62 thus being adapted to be set at a position upon the measuring stick corresponding to the length of a ply of tire fabric. 64 is a sharp pin projecting upward from the surface of the table adjacent the zero end of the measuring stick 53 and adapted to anchor the work when the latter is placed upon it.

In the operation of the apparatus, the stock rolls 17, being made up as previously stated of short strips interwound with liners, are mounted on the turret 11 and the liners are started on the liner rolls 16, as shown in Figs. 1 and 2. A leader, 19, may be started, with a liner from the roll 26, upon the stock roll 27 at the delivery end of the apparatus, although I do not limit my claims wholly to the use of a stock re-winding roll or a leader.

A strip of bias-cut fabric stock is pulled from the roll 17 onto the table 10, and the end of the leader 19 may be secured thereto, as shown in Fig. 1. Said stock strip is positioned upon the table 10 with respect to the measuring stick 53, and its leading end is secured upon the pin 64. If a leader is used a small margin may be allowed for the leader seam, as shown, to be torn off during the tire-building operation.

The indicator 62 is set at a position on the measuring stick 53 at such distance from the pin 54 as to correspond to the circumference of the tire. If the tire fabric is to be substantially elongated in the operation of stretching it onto the tire-core, allowance for such stretch may be made in the setting of the indicator 62.

Assuming, merely as an example, that the tire strip is to consist of two relatively narrow plies to go under the bead, and two relatively wide plies to go over the bead, it will be seen that the latter, in order to be drawn onto the tire-core last, should be plied up and wound into the stock roll 27 first. Let us assume also that splicers are not to be allowed less than eight inches from each other or from the first or last end of the tire strip. It is known in advance that there must be a seam where the wide stock joins the narrow stock, but under the rule stated such seam, or any other, must not come within eight inches on the tire circumference from the strip end $a$ (Fig. 1), or the part of the strip opposite the indicator 62, which will underlie the strip end $a$ in the tire. The wide strip therefore preferably will be continued for eight inches beyond the length of two plies, and it is known at the beginning that when the partially formed tire-strip has been moved the length of two plies or tire circumferences relative to the table, which may be done by turning the hand-crank 35, the end of the second assembled ply will be at the pin 64 and the seam between the wide and narrow stock will be at $b$ (Fig. 1) eight inches therefrom. The finger $b$ at that point may therefore be laid over onto the measuring stick 53, at the beginning, as shown in Fig. 1, to indicate the point of the tire circumference where it is known that there will be a splice, so that no other splices will be made within eight inches of such point. Splices in the first assembled ply, however, may be made at $c$ and $d$, since neither of them is within eight inches of the strip end $a$, or the indicator 62, which represents a part of the strip which will underlie $a$, or within eight inches of $b$, representing the point on the tire circumference where the seam between the wide and narrow stock will come. When the splices are made at $c$ and $d$, the corresponding fingers are laid over, as shown, and so with succeeding splices in subsequently assembled plies. Thus if the operator makes no splice within eight inches of the pin 64, the indicator 62, or a marker, all splices in the finished tire will be at least eight inches from each other and from the ends of the tire strip. The relatively short strips of material are drawn from one or another of the stock reels 17 according as narrow or wide strips are desired, and are spliced together upon the table 10 in accordance with the considerations above set out, the strips being cut or torn across obliquely when necessary to prevent two splices coming excessively close together. A tire strip is thus produced, which is advanced, by turning the handle 35, onto the stock rewinding roll 27, in successive movements each one ply in length, whereby the rear end of each ply is brought to a stop at the pin 64 and may be anchored thereon while the next ply is spliced onto it. When a tire strip has been completed, one of the levers 59 is raised to turn back all of the fingers that have been used as markers, and the operation is repeated for the next tire strip.

Various modifications may be resorted to without departing from the scope of my invention, and I do not limit myself wholly to the specific construction or arrangement shown.

I claim:

1. Apparatus for plying up tire fabric comprising means for supporting successive lengths of the work in a longitudinal space corresponding to the circumferential length of a tire, means defining said longitudinal space, and a set of markers adapted to be moved individually into marking position intermediate the first said markers to represent corresponding points on successive lengths of the work.

2. Apparatus for plying up tire fabric comprising a table adapted for the splicing of tire fabric thereon and dragging of the tire fabric thereover, and a set of markers mounted in a row lengthwise of the work at one side of the course of travel of the latter, said markers being secured against movement lengthwise of the work but adapted individually to be moved laterally to marking position.

3. Apparatus for plying up tire fabric comprising a table, a set of markers mounted in a row lengthwise of the work, said markers being secured against movement lengthwise of the work but adapted individually to be moved laterally to marking position, and means for anchoring the work approximately at one end of said row of markers.

4. Apparatus for plying up tire fabric comprising means for supporting successive lengths of the work in a longitudinal space corresponding to the circumferential length of a tire, means defining said longitudinal space, a set of markers adapted to be moved individually into marking position to represent corresponding points on successive lengths of the work, and common means for throwing said markers out of marking position.

5. Apparatus for plying up tire fabric comprising a table, adapted for the splicing of tire-fabric thereon and the dragging of the tire-fabric thereover, a set of markers mounted in a row lengthwise of the work and at one side of the course of travel of the latter, said markers being secured against movement lengthwise of the work but adapted individually to be moved laterally to marking position, and common means for throwing said markers out of marking position.

6. Apparatus for plying up tire fabric comprising a table, a rod mounted on said table parallel with the work, stock anchoring means and an indicator defining a space embracing said markers, a set of markers pivoted on said rod, and a bar adapted to be swung about said rod to throw said markers out of marking position.

7. Apparatus for plying up tire fabric comprising a table provided with a linear scale, a set of markers mounted in fixed positions lengthwise of said scale but adapted individually to be moved laterally thereof, and an indicator adapted to be fixed in different positions lengthwise of said scale.

8. Apparatus for plying up tire fabric comprising a table, means for accessibly holding a supply of fabric strips, means for drawing the work along said table, and a set of markers mounted on said table in fixed positions lengthwise of the work but adapted individually to be moved laterally thereof into marking position.

9. Apparatus for plying up tire fabric comprising a table, a turret mounted upon said table and adapted to hold a plurality of stock rolls selectively in working alignment with said table, and a set of markers mounted on said table.

10. Apparatus for plying up tire fabric comprising a ply up table, means defining a longitudinal space along the travel of the work on said table, a set of markers adapted to be placed to mark respective positions in said space, and means for drawing the work from said table.

11. Apparatus for plying up tire fabric comprising a ply-up table, means for anchoring one end of the work thereon, an indicator adapted to be secured in adjusted positions on said table at different distances from said anchoring means, and a set of markers adapted individually to be placed to mark respective positions between said anchoring means and said indicator.

In witness whereof I have hereunto set my hand this 25th day of May, 1921.

JOHN R. GAMMETER.